April 2, 1963 L. J. LOVISEK 3,083,609
SELF-TAPPING SCREW HAVING ITS THREAD INTERRUPTED BY
LONGITUDINALLY EXTENDING AND CIRCUMFERENTIALLY
SPACED-APART FLUTES
Filed May 28, 1959
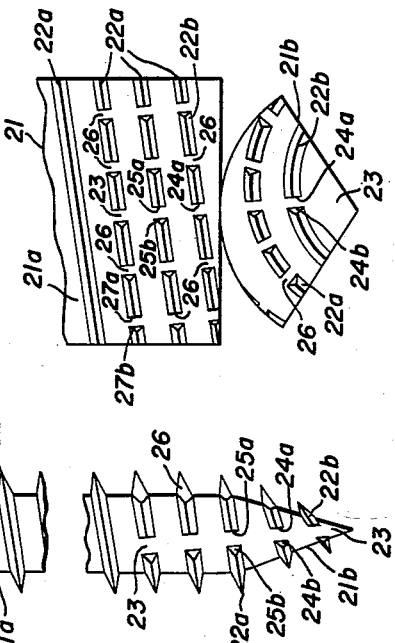
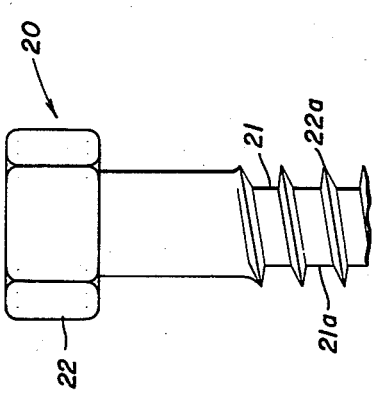
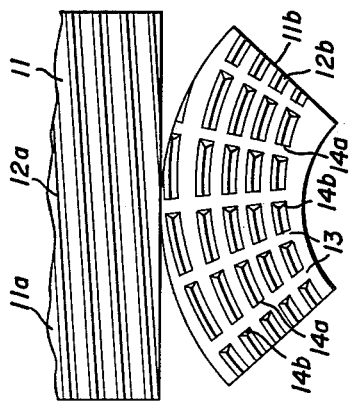
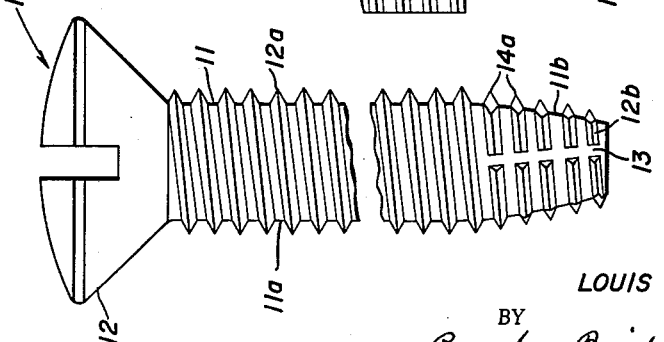
INVENTOR.
LOUIS J. LOVISEK
BY
Prangley, Baird, Clayton,
Miller & Vogel,
ATTYS.

United States Patent Office 3,083,609
Patented Apr. 2, 1963

3,083,609
SELF-TAPPING SCREW HAVING ITS THREAD INTERRUPTED BY LONGITUDINALLY EXTENDING AND CIRCUMFERENTIALLY SPACED-APART FLUTES
Louis J. Lovisek, Ridgewood, N.J., assignor to General American Transportation Corporation, Chicago, Ill., a corporation of New York
Filed May 28, 1959, Ser. No. 816,511
2 Claims. (Cl. 85—47)

The present invention relates to self-tapping screw fasteners, and more particularly to such screw fasteners that afford certain advantages in tightness of fit and ease of application.

Heretofore a well-known type of self-tapping screw fastener has been widely utilized in various manufacturing fields including automotive, aircraft and home appliance. This prior screw fastener comprises a longitudinally extending threaded shaft having a plurality of substantially longitudinally extending and circumferentially spaced-apart flutes therein, whereby each of the flutes interrupts a plurality of the threads forming a corresponding plurality of longitudinally spaced-apart cutting faces on the interrupted threads, so that the cutting faces cut or form a screw thread in the material into which the screw fastener is inserted and driven in place; thereby this prior screw fastener is particularly well-suited to the joining together of parts or members formed of plastic material, sheet metal material, relatively soft cast metals, and also for securing to such parts various elements, such as electrical conductors, and the like. Usually, a pilot hole is provided in the part into which the screw fastener is to be inserted, the pilot hole generally corresponding in diameter to the minor diameter of the screw fastener, so that the cutting faces mentioned will thread the pilot hole as the screw fastener is driven in place.

In this prior screw fastener, the circumferentially spaced-apart flutes mentioned extend longitudinally rearwardly from the lead or pilot end of the screw fastener onto the main body portion thereof terminating in a common plane extending substantially perpendicularly to the axis of the screw fastener. Accordingly, the flutes mentioned have the same length and thus intersect a thread on the screw fastener at different points therealong, by virtue of the disposition of the threads at a helix angle intersecting the plane in which the flutes terminate. Hence: one flute may terminate at the crest or apex of a thread; another flute may terminate on the leading flank of the thread; and still another flute may terminate on the following flank of the thread. This indiscriminate termination of the flutes presents manufacturing problems in the manufacture of such screw fasteners that have not been heretofore solved.

Also, in this prior screw fastener, each of the flutes is of considerable depth, so that the bottom thereof penetrates substantially below the minor diameter of the threads provided both on the forwardly tapered pilot end portion of the shank and on the substantially cylindrical main body portion of the shank disposed rearwardly with respect to the pilot end portion thereof; which arrangement was employed for the primary purpose of receiving the chips cut from the material by the cutting faces mentioned incident to the driving of the screw fastener.

In the manufacture of this prior self-tapping screw fastener by a rolling method, which is the best and most practical method of manufacture, the material of the blank, which is subjected to the rolling step, is displaced to provide both the flutes in the shank and the threads on the shank of the screw fastener; and fundamentally it is desirable that the displaced material from the body of the blank flows into the threads being formed on the shank.

Now it is virtually impossible to cause all of the displaced material of the blank to flow uniformly into the threads from the blank body; whereby a definite surplusage of material is usually accumulated at the ends of the flutes. While such material surplusage is of no significant consequence at the extreme lead end or point of the screw fastener, such excess material at the rear end of the flute results in bulging or malformation of the thread which is intersected by the flute.

As a result of such bulging or malformation of a thread, or threads, on the shank of the screw fastener, the tendency during driving of the screw fastener is for the bulging or malformed thread, or threads, to fail to follow the helical path of the preceding properly formed threads. Thus higher driving torque is required than would be necessary if the thread form were uniform, and hesitant or intermittent driving of the screw fastener results; which comprises distinct disadvantages in production line assembly of parts, particularly where power drivers are utilized and the work progresses along the production line at a rapid and predetermined speed.

Furthermore, the non-interrupted threads on the shank of the screw fastener following the bulging or malformed thread thereon have a loose fit into the work, after the malformed thread is forced through the material of the work, than would be the case if the thread form had uniformity.

Accordingly, it is a general object of the present invention to provide a self-tapping threaded fastener comprising completely formed and altogether uniform threads on the shank thereof, notwithstanding the interruption of the threads by the formation therein of the cutting faces; whereby the thread form is totally continuous and uniform and is free from bulges and malformations.

Another object of the invention is to provide a screw fastener comprising a longitudinally extending threaded shank having a plurality of substantially longitudinally extending and circumferentially spaced-apart flutes therein, wherein the bottom of each of the flutes lies substantially along the minor diameter of the threads and the rear end of each of the flutes terminates substantially at the root between an adjacent pair of the threads; whereby each of the flutes interrupts a plurality of threads forming a corresponding plurality of longitudinally spaced-apart cutting faces on the interrupted threads.

Another object of the invention is to provide a screw fastener of the character noted, wherein both the flutes in the shank and the threads on the shank are of the rolled-in type produced by the usual rolling method.

A further object of the invention is to provide a screw fastener of the type noted, wherein the lead or pilot end of the screw may be either truncated or pointed, while preserving the uniformity of the threads both on the pilot end portion of the shank and on the main body portion thereof.

In the production of a self-tapping screw fastener in accordance with the foregoing objects, and utilizing a thread-rolling method, the material displaced from the shank to form the flutes flows into the roots of the threads where it is dispersed by the thread-rolling dies, so as to avoid the previously mentioned bulging or malformation of the thread form. Moreover, the construction of the screw fastener wherein the bottom of each of the flutes lies substantially along the minor diameter of the threads on the shank minimizes the amount of material that is displaced from the shank, thereby reducing or minimizing the amount of such material that is displaced from the roots of the threads by the thread-rolling dies.

Accordingly, a still further object of the invention is to provide a self-tapping screw fastener which has threads having a uniform thread configuration so that each thread follows exactly and smoothly behind the preceding thread, thus reducing the necessary driving torque and resulting in smooth driving of the screw fastener and a tight fit of the parts that are assembled by the screw fastener.

Further features of the invention pertain to the particular arrangement of the elements of the screw fastener, whereby the above-outlined and additional operating features thereof are attained.

The invention, both as to its organization and method of operation, together with further objects and advantages thereof, will best be understood by reference to the following specification taken in connection with the accompanying drawing, in which:

FIGURE 1 is a fragmentary side elevational view of a screw fastener of the truncated pilot end type, embodying the present invention;

FIG. 2 is a plan development of the pilot end portion and the adjacent body portion of the shank of the screw of FIG. 1, illustrating the disposition and arrangement of all of the flutes formed therein;

FIG. 3 is a fragmentary side elevational view of a screw fastener of the pointed pilot end type also embodying the present invention; and FIG. 4 is a plan development of the pilot end portion and the adjacent body portion of the shank of the screw of FIG. 3, illustrating the disposition and arrangement of all of the flutes formed therein.

Referring now to FIGS. 1 and 2 of the drawing, there is illustrated a screw fastener 10 embodying the features of the present invention and comprising an elongated shank 11 terminating at the rear end thereof in a conical slotted head 12. The shank 11 includes a main body portion 11a and a forwardly tapered truncated pilot end portion 11b respectively carrying full and completely formed threads 12a and 12b that are of uniform thread form. Also, the pilot end portion 11b of the shank 11 carries a plurality of substantially longitudinally extending and circumferentially spaced-apart flutes 13 therein; and in the arrangement illustrated, five of the flutes 13 are provided in the pilot end portion 11b of the shank 11 in substantially equally spaced-apart relation.

As clearly illustrated in FIG. 1, the center line of each of the flutes 13 is disposed at a slight angle of about 5° with a radial plane extending through the center line of the shank 11; and each of the flutes 13 is disposed substantially normal to the helix angle of each of the threads 12b in interrupting relation with respect thereto. More particularly, each of the flutes 13 interrupts each of the threads 12b on the pilot end portion 11b of the shank 11; and the bottom of each of the flutes 13 lies substantially along the minor diameter of the threads 12b and the rear end of each of the flutes 13 terminates substantially at the root between the adjacent pair of the threads 12b. Accordingly, each of the flutes 13 interrupts a plurality of the threads 12b forming a corresponding plurality of longitudinally spaced-apart pairs of leading-following faces 14a—14b on the interrupted threads 12b; each of the leading faces 14a constitutes a cutting face having a substantially triangular configuration and is disposed in a plane substantially coinciding with a substantially radial plane passing through the base thereof; and each of the following faces 14b is also of substantially triangular configuration and is disposed in a plane forwardly inclined with respect to a substantially radial plane passing through the base thereof.

As clearly illustrated in FIG. 2, the rear ends of the flutes 13 terminate at the root between the last thread 12b on the pilot end portion 11b of the shank 11 and the first thread 12a on the main body portion 11a of the shank 11; whereby no one of the flutes 13 terminates in neither the crest nor the flank of a thread 12b or 12a, thereby avoiding bulging or malformation of the thread. Since the rear ends of the flutes 13 terminate at the root between the same adjacent pair of threads 12b—12a, they are necessarily of different lengths, as clearly illustrated in FIG. 2, thereby avoiding the partial penetration of the adjacent one of the threads 12a, for the reason previously explained.

Of course, it will be understood that in the manufacture of the screw fastener 10, the thread rolling method is employed; whereby the material of the pilot end portion of the shank of the blank is displaced therefrom into the roots between the threads 12b; which displaced material is dispersed by the rolling dies in the formation of the threads 12b, thereby to insure uniformity in the thead form. Moreover, the amount of material that is thus displaced in the formation of the flutes 13 is minimized by virtue of the fact that the bottom of each of the flutes 13 does not penetrate into the pilot end portion 11b of the shank 11 below the roots of the threads 12b, since the bottom of each of the flutes 13 lies substantially along the minor diameter of the threads 12b.

Of course, it will be understood that in the use of the screw fastener 10, a pilot hole is normally formed in the workpiece in order to receive the pilot end 11b of the shank 11, so as to accommodate driving of the screw fastener 10. As the screw fastener 10 is driven, the cutting faces 14a on the interrupted threads 12b cut the workpiece so that the following interrupted threads 12b are guided and the resulting helical path or thread is produced in the workpiece by the cutting actions of the cutting faces 14a. As the screw fastener 10 is driven forwardly, the interrupted threads 12a follow smoothly into the perfectly formed helical path or thread cut into the workpiece, thereby to insure smooth driving of the screw fastener 12 and a tight fit with respect to the workpiece.

Referring now to FIGS. 3 and 4 of the drawing, there is illustrated a screw fastener 20 also embodying the features of the present invention and comprising an elongated shank 21 terminating at the rear end thereof in a hexagonal head 22. The shank 21 includes a main body portion 21a and a forwardly tapered pointed pilot end portion 21b respectively carrying full and completely formed threads 22a and 22b that are of uniform thread form, there being a substantial plurality of the body threads 22a and only two of the pilot end threads 22b. Also, the pilot end portion 21b and the main body portion 21a of the shank 21 carry a substantially longitudinally extending main flute 23 therein extending from the point of the pilot end portion 21b rearwardly onto the main body portion 21a of the shank 21. As clearly illustrated in FIG. 3 the center line of the main flute 23 is disposed at a slight angle of about 5° with a radial plane extending through the center line of the shank 21; and the main flute 23 is disposed substantially normal to the helix angle of each of the threads 22b and 22a and in interrupting relation with respect thereto. More particularly, the main flute 23 interrupts both of the threads 22b provided on the pilot end portion 21b of the shank 21 and interrupts three of the threads 22a provided on the adjacent main body portion 21a of the shank 21. The main flute 23 lies substantially along the minor diameter of the threads 22b and 22a, and the rear end thereof terminates substantially at the root between the adjacent pair of the threads 22a on the main body portion 21a of the shank 21. Accordingly, the main flute 23 interrupting both of the pilot threads 22b and three of the body threads 22a respectively forms two corresponding pairs of leading-following faces 24a—24b on the interrupted pilot threads 22b and three corresponding pairs of leading-following faces 25a—25b on the interrupted body threads 22a. Each of the leading faces 24a and 25a constitutes a cutting face having a substantially triangular configuration and is disposed in a plane substantially coinciding with a substantially radial plane passing through the base thereof; and each of the following faces 24b and 25b is also of substantially triangular configuration and is disposed in a plane forwardly inclined with respect to a substantially radial plane passing through the base thereof.

Further the main body portion 21a of the shank 21 carries a plurality of substantially longitudinally extending and circumferentially spaced-apart auxiliary flutes 26 therein; and in the arrangement illustrated, four of the auxiliary flutes 26 are provided in the main body portion 21a of the shank 21. Specifically, the four auxiliary flutes 26 and the main flute 23 are arranged in substantially equally spaced-apart relation. As clearly illustrated in FIG. 3, the center line of each of the body flutes 26 is disposed at a slight angle of about 5° with a radial plane extending through the center line of the shank 21; and each of the auxiliary flutes 26 is disposed substantially normal to the helix angle of each of the threads 22b and 22a and in interrupting relation with respect thereto. More particularly, each of the auxiliary flutes 26 interrupts only the rearmost thread 22b provided on the pilot end portion 21b of the shank 21 and interrupts three of the threads 22a provided on the adjacent main body portion 21a of the shank 21. Each of the auxiliary flutes 26 lies substantially along the minor diameter of the threads 22b and 22a; and the rear end of each of the auxiliary flutes 26 terminates substantially at the root between an adjacent pair of the threads 22a on the main body portion 21a of the shank 21; and the front of each of the auxiliary flutes 26 terminates substantially at the root between the two threads 22b on the pilot end portion 21b of the shank 21. Accordingly, each of the auxiliary flutes 26 interrupting one of the pilot threads 22b and three of the body threads 22a respectively forms one corresponding pair of leading-following faces 24a—24b on the interrupted pilot thread 22b and three corresponding pairs of leading-following faces 27a—27b on the interrupted body threads 22a. Each of the leading faces 24a and 27a constitutes a cutting face having a substantially triangular configuration and is disposed in a plane substantially coinciding with a substantially radial plane passing through the base thereof; and each of the following faces 24b and 27b is also of substantially triangular configuration and is disposed in a plane forwardly inclined with respect to a substantially radial plane passing through the base thereof.

Of course, it will be understood that in the manufacture of the screw fastener 20, the thread rolling method is employed; whereby the material of both the pilot end portion and the main body portion of the shank of the blank are displaced therefrom into the roots between the threads 22b and 22a; which displaced material is dispersed by the rolling dies in the formation of the threads 22b and 22a, thereby to insure uniformity of the thread form. Moreover, the amount of material that is thus displaced in the formation of the flutes 23 and 26 is minimized by virtue of the fact that the bottom of each of the flutes 23 and 26 does not penetrate into the adjacent portion of the shank 11 below the roots of the threads 22b and 22a, since the bottom of each of the flutes 23 and 26 lie substantially along the minor diameter of the threads 22b and 22a.

The particular form of the screw fastener 20 is very advantageous when employed in workpieces formed of wood, plastic and other materials that may be readily deformed and cut. As the screw fastener 20 is driven, the cutting faces 24a on the interrupted pilot threads 22b first cut the workpiece, and thereafter the cutting faces 25a and 27a on the interrupted body threads 22a continue the cutting action in the initially formed helical path or thread that is produced in the workpiece, thereby to provide in the workpiece the final thread by the composite cutting actions of the cutting faces 24a, 25a and 27a. As the screw fastener 20 is driven forwardly, the interrupted body threads 22a follow smoothly into the perfectly formed helical path or thread cut into the workpiece, thereby to insure the subsequent reception of the uninterrupted body threads and the consequent smooth driving of the screw fastener 20 and a tight fit with respect to the workpiece.

In view of the foregoing, it is apparent that there has been provided a screw fastener of the self-tapping type embodying an improved construction and arrangement of the elements thereof that is productive of many advantages in tightness of fit and ease of application.

While there has been described what is at present considered to be the preferred embodiment of the invention, it will be understood that various modifications may be made therein, and it is intended to cover in the appended claims all such modifications as fall within the true spirit and scope of the invention.

What is claimed is:

1. A screw fastener comprising a longitudinally extending shank including a substantially cylindrical main body portion and a forwardly tapered pilot end portion terminating in a point, a continuous thread carried by said shank and including a plurality of body turns disposed on said body portion and two pilot end turns disposed on said pilot end portion, and a plurality of substantially longitudinally extending and circumferentially spaced-apart flutes provided in said thread, the bottom of one of said flutes lying substantially along the minor diameter of a plurality of said body turns and also substantially along the minor diameter of both of said pilot end turns and extending forwardly to said point, whereby said one flute interrupts both a plurality of said body turns and both of said pilot end turns forming corresponding longitudinally spaced-apart pairs of leading-following faces on said interrupted turns, the bottom of each of the other of said flutes lying substantially along the minor diameter of a plurality of said body turns and also substantially along the minor diameter of only the rearmost of said pilot end turns and terminating rearwardly of said point, whereby each of said other flutes interrupts both a plurality of said body turns and only the rearmost of said pilot end turns forming corresponding longitudinally spaced-apart pairs of leading-following faces on said interrupted turns, each of said leading faces constituting a cutting face with respect to an associated workpiece, the rear end of each of said flutes terminating substantially in the root between an adjacent pair of said body turns and the front end of each of said other flutes terminating substantially in the root between said two pilot end turns.

2. The screw fastener set forth in claim 1, wherein each of said leading faces is disposed in a plane substantially coincident with a radial plane passing through the base thereof and each of said following faces is disposed in a plane forwardly inclined with respect to a radial plane passing through the base thereof.

References Cited in the file of this patent

UNITED STATES PATENTS

| 497,510 | Adler | May 16, 1892 |
| 551,354 | Lee | Dec. 10, 1895 |
| 1,465,148 | Rosenberg | Aug. 14, 1923 |
| 2,165,011 | Rosenberg | July 4, 1939 |

FOREIGN PATENTS

| 466,039 | Great Britain | May 20, 1937 |
| 777,051 | Great Britain | Feb. 20, 1952 |
| 1,151,215 | France | Aug. 19, 1957 |